(12) United States Patent
Ellisor (10) Patent No.: US 12,540,673 B2
(45) Date of Patent: *Feb. 3, 2026

(54) SELF-LOCKING PLUG

(71) Applicant: Vulcan Industrial Holdings, LLC, Houston, TX (US)

(72) Inventor: Kyle Matthew Ellisor, Houston, TX (US)

(73) Assignee: Vulcan Industrial Holdings, LLC, Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 19/070,652

(22) Filed: Mar. 5, 2025

(65) Prior Publication Data

US 2025/0237308 A1 Jul. 24, 2025

Related U.S. Application Data

(63) Continuation of application No. 18/540,973, filed on Dec. 15, 2023, now Pat. No. 12,345,332, which is a
(Continued)

(51) Int. Cl.
*F16J 13/02* (2006.01)
*F04B 39/12* (2006.01)
(Continued)

(52) U.S. Cl.
CPC .......... *F16J 13/02* (2013.01); *F04B 39/125* (2013.01); *F04B 39/14* (2013.01); *F04B 53/007* (2013.01);
(Continued)

(58) Field of Classification Search
CPC ...... F04B 39/125; F04B 39/14; F04B 53/007; F04B 53/16; F04B 53/22; F16J 13/02;
(Continued)

(56) References Cited

U.S. PATENT DOCUMENTS 1,316,539 A  9/1919  Ford
1,364,848 A  1/1921  Walsh
(Continued)

FOREIGN PATENT DOCUMENTS

CN  2556355 Y  6/2003
CN  201149099  11/2008
(Continued)

OTHER PUBLICATIONS

Blume, U.S. Pat. No. 6,544,012, issued Apr. 8, 2003, Fig. 12A.
(Continued)

*Primary Examiner* — Matthew Wiblin
(74) *Attorney, Agent, or Firm* — Womble Bond Dickinson (US) LLP (57) ABSTRACT

A fluid end, includes a plunger reciprocating within a first bore, the plunger increasing a pressure of a fluid within a pressure chamber. The fluid end also includes a second bore. The fluid end further includes a plug assembly associated with the second bore. The plug assembly includes a plug body positioned within the second bore. The plug assembly also includes a lock ring positioned, at least in part, within the second bore, the lock ring positioned to be driven radially outward responsive to a longitudinal force applied to the plug body.

20 Claims, 6 Drawing Sheets

Related U.S. Application Data continuation of application No. 17/405,321, filed on Aug. 18, 2021, now Pat. No. 11,846,356.

(51) Int. Cl.
  *F04B 39/14* (2006.01)
  *F04B 53/00* (2006.01)
  *F04B 53/16* (2006.01)
  *F04B 53/22* (2006.01)
  *F16J 13/08* (2006.01)
  *F16J 13/10* (2006.01)
  *F16J 13/12* (2006.01)

(52) U.S. Cl.
  CPC .............. *F04B 53/16* (2013.01); *F04B 53/22* (2013.01); *F16J 13/08* (2013.01); *F16J 13/10* (2013.01); *F16J 13/12* (2013.01)

(58) Field of Classification Search
  CPC ... F16J 13/08; F16J 13/10; F16J 13/12; F16K 27/12
  See application file for complete search history.

(56) References Cited

U.S. PATENT DOCUMENTS

| | | |
|---|---|---|
| 1,576,269 A | 3/1926 | Durant |
| 1,595,459 A | 8/1926 | Durant |
| 1,671,139 A | 5/1928 | Wilson |
| 1,836,068 A | 12/1931 | Goldsberry |
| 1,873,318 A | 8/1932 | Eason |
| 1,914,737 A | 6/1933 | Elms |
| 1,948,628 A | 2/1934 | Penick |
| 1,963,684 A | 6/1934 | Shimer |
| 1,963,685 A | 6/1934 | Shimer |
| 2,011,547 A | 8/1935 | Campbell |
| 2,069,443 A | 2/1937 | Hill |
| 2,103,504 A | 12/1937 | White |
| 2,143,399 A | 1/1939 | Abercrombie |
| 2,146,709 A | 2/1939 | Bird |
| 2,151,442 A | 3/1939 | Hardy |
| 2,163,472 A | 6/1939 | Shimer |
| 2,252,488 A | 8/1941 | Bierend |
| 2,304,991 A | 12/1942 | Foster |
| 2,506,128 A | 5/1950 | Ashton |
| 2,539,996 A | 1/1951 | Gleitz |
| 2,547,831 A | 4/1951 | Mueller |
| 2,713,522 A | 7/1955 | Lorenz |
| 2,719,737 A | 10/1955 | Fletcher |
| 2,745,631 A | 5/1956 | Shellman |
| 2,756,960 A | 7/1956 | Church |
| 2,898,082 A | 8/1959 | Von Almen |
| 2,969,951 A | 1/1961 | Walton |
| 2,977,874 A | 4/1961 | Ritzerfeld et al. |
| 2,982,515 A | 5/1961 | Clinton |
| 2,983,281 A | 5/1961 | Bynum |
| 3,049,082 A | 8/1962 | Barry |
| 3,053,500 A | 9/1962 | Atkinson |
| 3,063,467 A | 11/1962 | Roberts, Jr. |
| 3,120,960 A | 2/1964 | Pippert et al. |
| 3,166,332 A | 1/1965 | Olson |
| 3,224,817 A | 12/1965 | Carter |
| 3,276,390 A | 10/1966 | Bloudoff |
| 3,277,837 A | 10/1966 | Pangburn |
| 3,288,475 A | 11/1966 | Benoit |
| 3,459,363 A | 8/1969 | Miller |
| 3,474,808 A | 10/1969 | Elliott |
| 3,483,885 A | 12/1969 | Leathers |
| 3,489,098 A | 1/1970 | Roth |
| 3,489,170 A | 1/1970 | Leman |
| 3,512,787 A | 5/1970 | Kennedy |
| 3,590,387 A | 6/1971 | Landis |
| 3,640,501 A | 2/1972 | Walton |
| 3,652,098 A | 3/1972 | Kawazu et al. |
| 3,698,726 A | 10/1972 | Schettler |
| 3,738,665 A | 6/1973 | Bilco |
| 3,785,659 A | 1/1974 | Maurer et al. |
| 3,809,508 A | 5/1974 | Uchiyama |
| 3,847,511 A | 11/1974 | Cole |
| 3,907,307 A | 9/1975 | Maurer |
| 3,931,755 A | 1/1976 | Hatridge |
| 4,044,834 A | 8/1977 | Perkins |
| 4,076,212 A | 2/1978 | Leman |
| 4,184,814 A | 1/1980 | Parker |
| 4,219,204 A | 8/1980 | Pippert |
| 4,277,229 A | 7/1981 | Pacht |
| 4,306,728 A | 12/1981 | Huperz |
| 4,331,741 A | 5/1982 | Wilson |
| 4,395,050 A | 7/1983 | Wirz |
| 4,398,731 A | 8/1983 | Gorman |
| 4,440,404 A | 4/1984 | Roach |
| 4,500,267 A | 2/1985 | Birdwell |
| 4,508,133 A | 4/1985 | Hamid |
| 4,518,359 A | 5/1985 | Yao-Psong |
| 4,527,806 A | 7/1985 | Ungchusri |
| 4,565,297 A | 1/1986 | Korner |
| 4,580,791 A | 4/1986 | DiRusso |
| 4,662,392 A | 5/1987 | Vadasz |
| 4,754,950 A | 7/1988 | Tada |
| 4,763,876 A | 8/1988 | Oda |
| 4,768,933 A | 9/1988 | Stachowiak |
| 4,770,206 A | 9/1988 | Sjoberg |
| 4,807,890 A | 2/1989 | Gorman |
| 4,811,758 A | 3/1989 | Piper |
| 4,822,058 A | 4/1989 | Butler et al. |
| 4,861,241 A | 8/1989 | Gamboa |
| 4,872,395 A | 10/1989 | Bennitt et al. |
| 4,878,815 A | 11/1989 | Stachowiak |
| 4,919,719 A | 4/1990 | Abe |
| 4,951,707 A | 8/1990 | Johnson |
| 5,020,490 A | 6/1991 | Seko |
| 5,052,435 A | 10/1991 | Crudup |
| 5,061,159 A | 10/1991 | Pryor |
| 5,062,450 A | 11/1991 | Bailey |
| 5,073,096 A | 12/1991 | King et al. |
| 5,080,713 A | 1/1992 | Ishibashi |
| 5,088,521 A | 2/1992 | Johnson |
| 5,127,807 A | 7/1992 | Eslinger |
| 5,131,666 A | 7/1992 | Hutchens |
| 5,135,238 A | 8/1992 | Wells |
| 5,149,107 A | 9/1992 | Maringer |
| 5,201,491 A | 4/1993 | Domangue |
| 5,209,495 A | 5/1993 | Palmour |
| 5,249,600 A | 10/1993 | Blume |
| 5,267,736 A | 12/1993 | Pietsch |
| 5,273,570 A | 12/1993 | Sato |
| 5,299,812 A | 4/1994 | Brestel |
| 5,314,659 A | 5/1994 | Hidaka |
| 5,362,215 A | 11/1994 | King |
| 5,382,057 A | 1/1995 | Richter |
| 5,478,048 A | 12/1995 | Salesky |
| 5,493,951 A | 2/1996 | Harrison |
| 5,533,245 A | 7/1996 | Stanton |
| 5,540,570 A | 7/1996 | Schuller |
| 5,572,920 A | 11/1996 | Kennedy |
| 5,593,166 A | 1/1997 | Lovell et al. |
| 5,626,345 A | 5/1997 | Wallace |
| 5,636,688 A | 6/1997 | Bassinger |
| 5,674,449 A | 10/1997 | Liang |
| 5,806,858 A | 9/1998 | Harrelson, III |
| 5,834,664 A | 11/1998 | Aonuma |
| 5,859,376 A | 1/1999 | Ishibashi |
| 5,895,517 A | 4/1999 | Kawamura |
| 5,924,853 A | 7/1999 | Pacht |
| 5,949,003 A | 9/1999 | Aoki |
| 6,139,599 A | 10/2000 | Takahashi |
| 6,200,688 B1 | 3/2001 | Liang |
| 6,209,445 B1 | 4/2001 | Roberts, Jr. |
| 6,328,312 B1 | 12/2001 | Schmitz |
| 6,340,377 B1 | 1/2002 | Kawata |
| 6,382,940 B1 | 5/2002 | Blume |
| 6,386,548 B1 | 5/2002 | Grimanis et al. |
| 6,436,338 B1 | 8/2002 | Qiao |
| 6,446,939 B1 | 9/2002 | Hoppe |

(56) References Cited

U.S. PATENT DOCUMENTS

| | | |
|---|---|---|
| 6,460,620 B1 | 10/2002 | LaFleur |
| 6,464,749 B1 | 10/2002 | Kawase |
| 6,482,275 B1 | 11/2002 | Qiao |
| 6,485,678 B1 | 11/2002 | Liang |
| 6,544,012 B1 | 4/2003 | Blume |
| 6,571,684 B1 | 6/2003 | Nov et al. |
| 6,623,259 B1 | 9/2003 | Blume |
| 6,634,236 B2 | 10/2003 | Mars |
| 6,641,112 B2 | 11/2003 | Antoff |
| 6,695,007 B2 | 2/2004 | Vicars |
| 6,702,905 B1 | 3/2004 | Qiao |
| 6,880,802 B2 | 4/2005 | Hara |
| 6,910,871 B1 | 6/2005 | Blume |
| 6,916,444 B1 | 7/2005 | Liang |
| 6,951,165 B2 | 10/2005 | Kuhn |
| 6,951,579 B2 | 10/2005 | Koyama |
| 6,955,181 B1 | 10/2005 | Blume |
| 6,959,916 B2 | 11/2005 | Chigasaki |
| 7,000,632 B2 | 2/2006 | McIntire |
| 7,036,824 B2 | 5/2006 | Kunz |
| 7,144,440 B2 | 12/2006 | Ando |
| 7,168,440 B1 | 1/2007 | Blume |
| 7,186,097 B1 | 3/2007 | Blume |
| 7,222,837 B1 | 5/2007 | Blume |
| 7,290,560 B2 | 11/2007 | Orr |
| 7,296,591 B2 | 11/2007 | Moe |
| 7,335,002 B2 | 2/2008 | Vicars |
| 7,341,435 B2 | 3/2008 | Vicars |
| 7,398,955 B2 | 7/2008 | Weingarten |
| 7,506,574 B2 | 3/2009 | Jensen |
| 7,513,483 B1 | 4/2009 | Blume |
| 7,513,759 B1 | 4/2009 | Blume |
| 7,562,675 B2 | 7/2009 | Nomichi et al. |
| 7,611,590 B2 | 11/2009 | Liang |
| 7,681,589 B2 | 3/2010 | Schwegman |
| 7,682,471 B2 | 3/2010 | Levin |
| 7,726,026 B1 | 6/2010 | Blume |
| 7,748,310 B2 | 7/2010 | Kennedy |
| 7,754,142 B2 | 7/2010 | Liang |
| 7,754,143 B2 | 7/2010 | Qiao |
| 7,757,396 B2 | 7/2010 | Sawada |
| 7,789,133 B2 | 9/2010 | McGuire |
| 7,789,161 B2 | 9/2010 | Riley |
| 7,793,913 B2 | 9/2010 | Hara |
| 7,828,053 B2 | 11/2010 | McGuire |
| 7,845,413 B2 | 12/2010 | Shampine |
| 7,861,738 B2 | 1/2011 | Erbes |
| 7,866,346 B1 | 1/2011 | Walters |
| 7,891,374 B2 | 2/2011 | Vicars |
| 7,931,078 B2 | 4/2011 | Toporowski et al. |
| 7,954,510 B2 | 6/2011 | Schwegman |
| 7,992,635 B2 | 8/2011 | Cherewyk |
| 8,020,638 B2 | 9/2011 | Chellappa et al. |
| 8,069,923 B2 | 12/2011 | Blanco |
| 8,075,000 B2 | 12/2011 | James et al. |
| 8,075,661 B2 | 12/2011 | Chen |
| 8,083,506 B2 | 12/2011 | Maki |
| 8,100,407 B2 | 1/2012 | Stanton |
| 8,141,849 B1 | 3/2012 | Blume |
| 8,147,227 B1 | 4/2012 | Blume |
| 8,181,970 B2 | 5/2012 | Smith |
| 8,201,832 B2 | 6/2012 | Kocurek |
| 8,261,771 B2 | 9/2012 | Witkowski |
| 8,287,256 B2 | 10/2012 | Shafer |
| 8,291,927 B2 | 10/2012 | Johnson |
| 8,292,301 B1 | 10/2012 | Gilstad et al. |
| 8,312,805 B1 | 11/2012 | Blume |
| 8,317,498 B2 | 11/2012 | Gambier |
| 8,328,202 B2 | 12/2012 | Foster et al. |
| 8,375,980 B2 | 2/2013 | Higashiyama |
| 8,376,723 B2 | 2/2013 | Kugelev |
| 8,402,880 B2 | 3/2013 | Patel |
| 8,430,075 B2 | 4/2013 | Qiao |
| D687,125 S | 7/2013 | Hawes |
| 8,479,700 B2 | 7/2013 | Qiao |
| 8,511,218 B2 | 8/2013 | Cordes |
| 8,522,667 B2 | 9/2013 | Clemens |
| 8,528,585 B2 | 9/2013 | McGuire |
| 8,529,230 B1 | 9/2013 | Colley, III et al. |
| 8,534,691 B2 | 9/2013 | Schaffer |
| 8,613,886 B2 | 12/2013 | Qiao |
| D700,682 S | 3/2014 | Bayyouk et al. |
| 8,662,864 B2 | 3/2014 | Bayyouk |
| 8,662,865 B2 | 3/2014 | Bayyouk |
| 8,668,470 B2 | 3/2014 | Bayyouk |
| 8,707,853 B1 | 4/2014 | Dille |
| 8,733,313 B2 | 5/2014 | Sato |
| 8,784,081 B1 | 7/2014 | Blume |
| 8,814,139 B2 | 8/2014 | Griffin et al. |
| 8,814,432 B2 | 8/2014 | Thoma et al. |
| 8,828,312 B2 | 9/2014 | Yao |
| 8,870,554 B2 | 10/2014 | Kent |
| 8,893,806 B2 | 11/2014 | Williamson |
| 8,894,392 B1 | 11/2014 | Blume |
| 8,915,722 B1 | 12/2014 | Blume |
| 8,940,110 B2 | 1/2015 | Qiao |
| 8,955,850 B2 | 2/2015 | Saucerman et al. |
| 8,978,695 B2 | 3/2015 | Witkowski |
| 8,998,593 B2 | 4/2015 | Vicars |
| 9,010,412 B2 | 4/2015 | McGuire |
| 9,016,693 B1 | 4/2015 | Shek et al. |
| 9,067,346 B2 | 6/2015 | Kohn et al. |
| 9,103,448 B2 | 8/2015 | Witkowski |
| 9,121,503 B2 | 9/2015 | Dietle et al. |
| 9,150,945 B2 | 10/2015 | Bei |
| 9,157,136 B2 | 10/2015 | Chou |
| 9,157,468 B2 | 10/2015 | Dille |
| 9,188,242 B2 | 11/2015 | Giove et al. |
| 9,206,910 B2 | 12/2015 | Kahn |
| D748,228 S | 1/2016 | Bayyouk |
| 9,243,630 B2 | 1/2016 | Foote |
| 9,260,933 B2 | 2/2016 | Artherholt |
| 9,261,195 B2 | 2/2016 | Toynbee |
| 9,273,543 B2 | 3/2016 | Baca |
| 9,284,631 B2 | 3/2016 | Radon |
| 9,284,953 B2 | 3/2016 | Blume |
| 9,285,040 B2 | 3/2016 | Forrest |
| 9,291,274 B1 | 3/2016 | Blume |
| 9,322,243 B2 | 4/2016 | Baca |
| 9,334,547 B2 | 5/2016 | Qiao |
| 9,340,856 B2 | 5/2016 | Otobe |
| 9,341,039 B2 | 5/2016 | Galle et al. |
| 9,359,921 B2 | 6/2016 | Hashimoto |
| 9,360,115 B2 | 6/2016 | Chaplin et al. |
| 9,365,913 B2 | 6/2016 | Imaizumi |
| 9,371,919 B2 | 6/2016 | Forrest |
| 9,376,930 B2 | 6/2016 | Kim |
| 9,377,019 B1 | 6/2016 | Blume |
| 9,382,940 B2 | 7/2016 | Lee |
| 9,416,887 B2 | 8/2016 | Blume |
| 9,435,454 B2 | 9/2016 | Blume |
| 9,441,776 B2 | 9/2016 | Bryne |
| 9,458,743 B2 | 10/2016 | Qiao |
| 9,464,730 B2 | 10/2016 | Bihlet |
| 9,500,195 B2 | 11/2016 | Blume |
| 9,506,382 B2 | 11/2016 | Yeager |
| 9,528,508 B2 | 12/2016 | Thomeer |
| 9,528,631 B2 | 12/2016 | McCarty |
| 9,534,473 B2 | 1/2017 | Morris |
| 9,534,691 B2 | 1/2017 | Miller |
| 9,556,761 B2 | 1/2017 | Koyama |
| 9,568,138 B2 | 2/2017 | Arizpe |
| 9,605,767 B2 | 3/2017 | Chhabra |
| 9,631,739 B2 | 4/2017 | Belshan |
| D787,029 S | 5/2017 | Bayyouk |
| 9,638,075 B2 | 5/2017 | Qiao |
| 9,638,337 B2 | 5/2017 | Witkowski |
| 9,650,882 B2 | 5/2017 | Zhang |
| 9,651,067 B2 | 5/2017 | Beschorner |
| 9,689,364 B2 | 6/2017 | Mack |
| 9,695,812 B2 | 7/2017 | Dille |
| 9,732,746 B2 | 8/2017 | Chandrasekaran |
| 9,732,880 B2 | 8/2017 | Haines |
| 9,745,968 B2 | 8/2017 | Kotapish |

(56) References Cited

U.S. PATENT DOCUMENTS

| | | |
|---|---|---|
| 9,784,262 B2 | 10/2017 | Bayyouk |
| 9,791,082 B2 | 10/2017 | Baxter et al. |
| 9,822,894 B2 | 11/2017 | Bayyouk |
| 9,845,801 B1 | 12/2017 | Shek |
| 9,857,807 B2 | 1/2018 | Baca |
| 9,915,250 B2 | 3/2018 | Brasche |
| 9,920,615 B2 | 3/2018 | Zhang |
| 9,927,036 B2 | 3/2018 | Dille |
| 9,945,362 B2 | 4/2018 | Skurdalsvold |
| 9,945,375 B2 | 4/2018 | Zhang |
| 9,957,770 B2 | 5/2018 | Averill et al. |
| 9,989,044 B2 | 6/2018 | Bayyouk |
| 10,029,540 B2 | 7/2018 | Seeger |
| D826,281 S | 8/2018 | Mead |
| 10,041,490 B1 | 8/2018 | Jahnke |
| 10,082,137 B2 | 9/2018 | Graham |
| 10,094,478 B2 | 10/2018 | Iijima |
| 10,113,679 B2 | 10/2018 | Shuck |
| 10,184,470 B2 | 1/2019 | Barnett, Jr. |
| 10,190,197 B2 | 1/2019 | Baker |
| 10,197,172 B2 | 2/2019 | Fuller |
| 10,215,172 B2 | 2/2019 | Wood |
| 10,221,848 B2 | 3/2019 | Bayyouk |
| 10,240,594 B2 | 3/2019 | Barnhouse, Jr. |
| 10,240,597 B2 | 3/2019 | Bayyouk |
| 10,247,182 B2 | 4/2019 | Zhang |
| 10,247,184 B2 | 4/2019 | Chunn |
| 10,260,634 B2 | 4/2019 | Lenhert et al. |
| 10,273,954 B2 | 4/2019 | Brown |
| 10,288,178 B2 | 5/2019 | Nowell |
| 10,309,182 B2 | 6/2019 | Jones et al. |
| 10,316,832 B2 | 6/2019 | Byrne |
| 10,330,097 B2 | 6/2019 | Skurdalsvold |
| 10,344,757 B1 | 7/2019 | Stark |
| 10,364,487 B2 | 7/2019 | Park |
| D856,498 S | 8/2019 | Bayyouk |
| 10,378,535 B2 | 8/2019 | Mahmood |
| 10,378,538 B2 | 8/2019 | Blume |
| 10,378,659 B2 | 8/2019 | Scott et al. |
| 10,393,113 B2 | 8/2019 | Wagner |
| 10,400,764 B2 | 9/2019 | Wagner |
| 10,415,348 B2 | 9/2019 | Zhang |
| 10,415,719 B2 | 9/2019 | Leboeuf et al. |
| D861,834 S | 10/2019 | Foster et al. |
| D864,691 S | 10/2019 | Campos |
| 10,428,406 B2 | 10/2019 | Yao |
| 10,428,949 B2 | 10/2019 | Miller |
| 10,436,193 B1 | 10/2019 | Jahnke |
| 10,443,456 B2 | 10/2019 | Hoeg |
| 10,465,680 B1 | 11/2019 | Guerra |
| 10,472,702 B2 | 11/2019 | Yeh |
| 10,487,528 B2 | 11/2019 | Pozybill |
| D871,455 S | 12/2019 | Crowsley |
| 10,519,070 B2 | 12/2019 | Sanders |
| 10,519,950 B2 | 12/2019 | Foster |
| 10,526,862 B2 | 1/2020 | Witkowski |
| 10,527,036 B2 | 1/2020 | Blume |
| 10,557,446 B2 | 2/2020 | Stecklein |
| 10,557,576 B2 | 2/2020 | Witkowski |
| 10,557,580 B2 | 2/2020 | Mendyk |
| 10,563,494 B2 | 2/2020 | Graham |
| 10,563,649 B2 | 2/2020 | Zhang |
| 10,570,491 B2 | 2/2020 | Hong |
| 10,576,538 B2 | 3/2020 | Kato |
| 10,577,580 B2 | 3/2020 | Abbas |
| 10,577,850 B2 | 3/2020 | Ozkan |
| 10,591,070 B2 | 3/2020 | Nowell |
| 10,605,374 B2 | 3/2020 | Takaki |
| D880,661 S | 4/2020 | Foster et al. |
| D881,958 S | 4/2020 | Han |
| 10,626,856 B2 | 4/2020 | Coldren |
| 10,633,925 B2 | 4/2020 | Panda |
| 10,634,260 B2 | 4/2020 | Said |
| 10,640,854 B2 | 5/2020 | Hu |
| 10,655,623 B2 | 5/2020 | Blume |
| 10,663,071 B2 | 5/2020 | Bayyouk |
| 10,670,013 B2 | 6/2020 | Foster |
| 10,670,153 B2 | 6/2020 | Filipow |
| 10,670,176 B2 | 6/2020 | Byrne |
| 10,677,109 B2 | 6/2020 | Qiao |
| 10,677,240 B2 | 6/2020 | Graham |
| 10,677,365 B2 | 6/2020 | Said |
| 10,711,567 B2 | 7/2020 | Buckley |
| 10,711,754 B2 | 7/2020 | Nelson |
| 10,711,778 B2 | 7/2020 | Buckley |
| 10,718,441 B2 | 7/2020 | Myers |
| D893,684 S | 8/2020 | Matthys |
| 10,731,523 B2 | 8/2020 | Qu |
| 10,731,643 B2 | 8/2020 | DeLeon |
| 10,738,928 B2 | 8/2020 | Arizpe |
| 10,753,490 B2 | 8/2020 | Fuller |
| 10,753,495 B2 | 8/2020 | Bayyouk |
| D895,777 S | 9/2020 | Chase |
| 10,767,520 B1 | 9/2020 | Hattiangadi |
| 10,771,567 B2 | 9/2020 | Sundaresan |
| 10,774,828 B2 | 9/2020 | Smith |
| 10,781,803 B2 | 9/2020 | Kumar |
| 10,787,725 B2 | 9/2020 | Fujieda |
| 10,801,627 B2 | 10/2020 | Warbey |
| 10,808,488 B2 | 10/2020 | Witkowski |
| 10,808,851 B1 | 10/2020 | Surjaatmadja et al. |
| 10,815,988 B2 | 10/2020 | Buckley |
| 10,815,989 B2 | 10/2020 | Naedler et al. |
| 10,830,360 B2 | 11/2020 | Frank |
| 10,837,556 B2 | 11/2020 | Chase et al. |
| 10,851,775 B2 | 12/2020 | Stark |
| 10,865,325 B2 | 12/2020 | Nakao |
| 10,895,325 B2 | 1/2021 | Nowell et al. |
| D910,820 S | 2/2021 | Grassl |
| 10,907,738 B2 | 2/2021 | Nowell |
| 10,914,171 B2 | 2/2021 | Foster |
| 10,914,383 B2 | 2/2021 | Kustermans et al. |
| 10,934,899 B2 | 3/2021 | Hattiangadi |
| 10,941,765 B2 | 3/2021 | Nowell |
| 10,941,866 B2 | 3/2021 | Nowell |
| 10,954,938 B2 | 3/2021 | Stark |
| 10,961,607 B2 | 3/2021 | Oshima |
| 10,962,001 B2 | 3/2021 | Nowell |
| D915,197 S | 4/2021 | Katano |
| D916,240 S | 4/2021 | Nowell |
| 10,968,717 B2 | 4/2021 | Tran |
| 10,988,834 B2 | 4/2021 | Lee |
| 10,989,321 B2 | 4/2021 | Hattiangadi |
| 10,995,738 B2 | 5/2021 | Blume |
| 11,009,016 B2 | 5/2021 | Berend |
| 11,028,662 B2 | 6/2021 | Rhodes |
| 11,041,570 B1 | 6/2021 | Buckley |
| 11,073,144 B1 | 7/2021 | Hurst et al. |
| 11,078,903 B2 | 8/2021 | Nowell |
| 11,104,981 B2 | 8/2021 | Chen |
| 11,105,185 B2 | 8/2021 | Spencer |
| 11,105,327 B2 | 8/2021 | Hurst |
| 11,105,328 B2 | 8/2021 | Bryne |
| 11,105,428 B2 | 8/2021 | Warbey |
| 11,111,915 B2 | 9/2021 | Bayyouk |
| 11,131,397 B2 | 9/2021 | Yan |
| D933,104 S | 10/2021 | Ellisor |
| D933,105 S | 10/2021 | Ellisor |
| D933,106 S | 10/2021 | Mullins |
| D933,107 S | 10/2021 | Mullins |
| 11,149,514 B2 | 10/2021 | Witkowski |
| 11,149,856 B2 | 10/2021 | Mattoni et al. |
| 11,156,221 B2 | 10/2021 | Stark et al. |
| 11,162,859 B2 | 11/2021 | Lei |
| 11,181,101 B2 | 11/2021 | Byrne |
| 11,181,108 B2 | 11/2021 | Brooks |
| 11,225,963 B2 | 1/2022 | Naedler et al. |
| 11,231,111 B2 | 1/2022 | Hurst |
| 11,242,849 B1 | 2/2022 | Smith |
| D949,202 S | 4/2022 | Sharpstone |
| 11,300,111 B2 | 4/2022 | Thomas et al. |
| 11,333,249 B2 | 5/2022 | Jones et al. |
| 11,353,117 B1 | 6/2022 | Smith |
| 11,359,615 B2 | 6/2022 | Thomas et al. |

(56) References Cited

U.S. PATENT DOCUMENTS

| | | |
|---|---|---|
| 11,384,756 B1 | 7/2022 | Smith |
| 11,391,374 B1 | 7/2022 | Ellisor |
| 11,421,679 B1 | 8/2022 | Mullins |
| 11,421,680 B1 | 8/2022 | Smith |
| 11,434,714 B2 | 9/2022 | Machocki |
| 11,434,900 B1 | 9/2022 | Alex |
| 11,441,683 B2 | 9/2022 | Mullins et al. |
| 11,454,321 B2 | 9/2022 | Mullins et al. |
| 11,473,686 B2 | 10/2022 | Bayyouk |
| 11,566,713 B2 | 1/2023 | Poremski |
| D980,876 S | 3/2023 | Smith |
| 11,608,896 B2 | 3/2023 | Al-Darra |
| D986,928 S | 5/2023 | Smith et al. |
| 11,692,544 B2 | 7/2023 | Chase |
| D997,992 S | 9/2023 | Smith et al. |
| 11,746,778 B2 | 9/2023 | Bayyouk |
| 11,761,441 B1 | 9/2023 | Alex et al. |
| D1,006,059 S | 11/2023 | Waniek |
| 11,846,356 B1 | 12/2023 | Ellisor |
| 11,891,988 B2 | 2/2024 | Mullins et al. |
| 11,920,684 B1 | 3/2024 | Xu et al. |
| D1,022,145 S | 4/2024 | Meyers |
| D1,031,952 S | 6/2024 | Huntley |
| D1,036,632 S | 7/2024 | Suzuki |
| 12,038,086 B2 | 7/2024 | Shuck |
| 12,049,889 B2 | 7/2024 | Ellisor et al. |
| D1,039,657 S | 8/2024 | Cox |
| 12,055,221 B2 | 8/2024 | Ellisor et al. |
| 12,092,226 B2 | 9/2024 | Elliott et al. |
| 12,140,240 B1 | 11/2024 | Xu |
| D1,061,623 S | 2/2025 | Newberg et al. |
| D1,063,005 S | 2/2025 | Lorkowski |
| 12,247,557 B2 | 3/2025 | Avey et al. |
| 12,247,561 B2 | 3/2025 | Avey et al. |
| 12,270,394 B2 | 4/2025 | Ellisor et al. |
| 12,292,120 B1 | 5/2025 | Mullins et al. |
| 12,292,121 B2 | 5/2025 | Berryhill |
| 12,297,922 B1 | 5/2025 | Xu |
| 12,345,253 B2 | 7/2025 | Mullins et al. |
| 12,345,332 B2 | 7/2025 | Ellisor |
| 12,366,244 B2 | 7/2025 | Alex et al. |
| 12,366,245 B1 | 7/2025 | Ellisor et al. |
| 12,404,931 B2 | 9/2025 | Ellisor et al. |
| 12,480,489 B2 | 11/2025 | Ellisor et al. |
| 12,498,051 B2 | 12/2025 | Xu et al. |
| 2002/0084004 A1 | 7/2002 | Takahashi |
| 2002/0124961 A1 | 9/2002 | Porter |
| 2002/0159914 A1 | 10/2002 | Yeh |
| 2003/0205864 A1 | 11/2003 | Dietle |
| 2003/0233910 A1 | 12/2003 | Jeong |
| 2004/0161351 A1 | 8/2004 | Forrest |
| 2004/0170507 A1 | 9/2004 | Vicars |
| 2004/0194576 A1 | 10/2004 | Ando |
| 2004/0234404 A1 | 11/2004 | Vicars |
| 2004/0255410 A1 | 12/2004 | Schonewille |
| 2004/0258557 A1 | 12/2004 | Shun |
| 2005/0095156 A1 | 5/2005 | Wolters |
| 2005/0098963 A1 | 5/2005 | Olsen |
| 2005/0200081 A1 | 9/2005 | Stanton |
| 2005/0226754 A1 | 10/2005 | Orr |
| 2006/0002806 A1 | 1/2006 | Baxter |
| 2006/0027779 A1 | 2/2006 | McGuire |
| 2006/0045782 A1 | 3/2006 | Kretzinger |
| 2007/0086910 A1 | 4/2007 | Liang |
| 2007/0154342 A1 | 7/2007 | Tu |
| 2007/0261746 A1 | 11/2007 | Nomichi et al. |
| 2007/0273105 A1 | 11/2007 | Stanton |
| 2007/0295411 A1 | 12/2007 | Schwegman |
| 2008/0031769 A1 | 2/2008 | Yeh |
| 2008/0042369 A1 | 2/2008 | Krywitsky et al. |
| 2008/0052014 A1 | 2/2008 | Toyosada |
| 2008/0092384 A1 | 4/2008 | Schaake |
| 2008/0240949 A1 | 10/2008 | Tackett et al. |
| 2008/0279706 A1 | 11/2008 | Gambier |
| 2009/0041611 A1 | 2/2009 | Sathian |
| 2009/0166980 A1 | 7/2009 | Miller et al. |
| 2009/0261575 A1 | 10/2009 | Bull |
| 2009/0278069 A1 | 11/2009 | Blanco |
| 2010/0143163 A1 | 6/2010 | Patel et al. |
| 2010/0230628 A1 | 9/2010 | Stefina |
| 2010/0272597 A1 | 10/2010 | Qiao |
| 2011/0079302 A1 | 4/2011 | Hawes |
| 2011/0142701 A1 | 6/2011 | Small |
| 2011/0189040 A1 | 8/2011 | Vicars |
| 2011/0255993 A1 | 10/2011 | Ochoa |
| 2011/0266752 A1 | 11/2011 | Kocurek |
| 2011/0296982 A1 | 12/2011 | Dille et al. |
| 2012/0141308 A1 | 6/2012 | Saini |
| 2012/0157786 A1 | 6/2012 | Pribanic |
| 2012/0163969 A1 | 6/2012 | Ongole |
| 2012/0259593 A1 | 10/2012 | El-Zein |
| 2012/0304821 A1 | 12/2012 | Ando |
| 2013/0020521 A1 | 1/2013 | Byrne |
| 2013/0037739 A1 | 2/2013 | Millard |
| 2013/0202457 A1 | 8/2013 | Bayyouk |
| 2013/0202458 A1 | 8/2013 | Byrne |
| 2013/0263932 A1 | 10/2013 | Baxter et al. |
| 2013/0319220 A1 | 12/2013 | Luharuka |
| 2014/0083541 A1 | 3/2014 | Chandrasekaran |
| 2014/0083547 A1 | 3/2014 | Hwang |
| 2014/0196883 A1 | 7/2014 | Artherholt |
| 2014/0260954 A1 | 9/2014 | Young |
| 2014/0286805 A1 | 9/2014 | Dyer |
| 2014/0319780 A1 | 10/2014 | Vertenten |
| 2014/0322034 A1 | 10/2014 | Bayyouk |
| 2014/0322050 A1 | 10/2014 | Marette et al. |
| 2014/0348677 A1 | 11/2014 | Moeller |
| 2015/0127308 A1 | 5/2015 | Thomas, Jr. et al. |
| 2015/0132157 A1 | 5/2015 | Whaley |
| 2015/0144826 A1 | 5/2015 | Bayyouk |
| 2015/0147194 A1 | 5/2015 | Foote |
| 2015/0219096 A1 | 8/2015 | Jain |
| 2015/0300332 A1 | 10/2015 | Kotapish |
| 2015/0368775 A1 | 12/2015 | Baker |
| 2016/0201169 A1 | 7/2016 | Vecchio |
| 2016/0215588 A1 | 7/2016 | Belshan |
| 2016/0238156 A1 | 8/2016 | Hubenschmidt |
| 2016/0245280 A1 | 8/2016 | Todorov |
| 2016/0258433 A1 | 9/2016 | Belshan et al. |
| 2016/0319626 A1 | 11/2016 | Dille |
| 2016/0319805 A1 | 11/2016 | Dille |
| 2016/0327165 A1 | 11/2016 | Sundararajan |
| 2017/0051738 A1 | 2/2017 | Horning |
| 2017/0067459 A1 | 3/2017 | Bayyouk |
| 2017/0089334 A1 | 3/2017 | Jahnke |
| 2017/0089470 A1 | 3/2017 | Filipow et al. |
| 2017/0089473 A1 | 3/2017 | Nowell |
| 2017/0097107 A1 | 4/2017 | Hotz |
| 2017/0102101 A1 | 4/2017 | Duval-Arnould |
| 2017/0122055 A1 | 5/2017 | Embury |
| 2017/0159655 A1 | 6/2017 | Morreale |
| 2017/0175799 A1 | 6/2017 | Arnold |
| 2017/0204852 A1 | 7/2017 | Barnett, Jr. |
| 2017/0218951 A1 | 8/2017 | Graham |
| 2017/0218993 A1 | 8/2017 | Freed |
| 2017/0268674 A1 | 9/2017 | Barbera et al. |
| 2017/0297149 A1 | 10/2017 | Shinohara |
| 2017/0298932 A1 | 10/2017 | Wagner |
| 2017/0314097 A1 | 11/2017 | Hong |
| 2017/0342776 A1 | 11/2017 | Bullock |
| 2017/0342976 A1 | 11/2017 | Reddy |
| 2018/0017173 A1 | 1/2018 | Nowell |
| 2018/0058431 A1 | 3/2018 | Blume |
| 2018/0073653 A1 | 3/2018 | Bayyouk |
| 2018/0202434 A1 | 7/2018 | Barnhouse, Jr. |
| 2018/0298894 A1 | 10/2018 | Wagner |
| 2018/0312946 A1 | 11/2018 | Gigliotti, Jr. |
| 2018/0320258 A1 | 11/2018 | Stewart |
| 2018/0340245 A1 | 11/2018 | Kernion |
| 2018/0354081 A1 | 12/2018 | Kalyani |
| 2018/0363642 A1 | 12/2018 | Salih et al. |
| 2019/0011051 A1 | 1/2019 | Yeung |
| 2019/0017503 A1 | 1/2019 | Foster |
| 2019/0024198 A1 | 1/2019 | Hong |

(56) References Cited

U.S. PATENT DOCUMENTS

| | | |
|---|---|---|
| 2019/0024225 A1 | 1/2019 | Tang |
| 2019/0032685 A1 | 1/2019 | Foster |
| 2019/0032720 A1 | 1/2019 | Bayyouk |
| 2019/0040966 A1 | 2/2019 | Myers et al. |
| 2019/0047049 A1 | 2/2019 | Fujieda |
| 2019/0049052 A1 | 2/2019 | Shuck |
| 2019/0063427 A1 | 2/2019 | Nowell |
| 2019/0063430 A1 | 2/2019 | Byrne |
| 2019/0071755 A1 | 3/2019 | Lee |
| 2019/0072088 A1 | 3/2019 | DeLeon |
| 2019/0072089 A1 | 3/2019 | Buckley |
| 2019/0085806 A1 | 3/2019 | Meibgeier |
| 2019/0085978 A1 | 3/2019 | Chase |
| 2019/0101109 A1 | 4/2019 | Cortes |
| 2019/0107226 A1 | 4/2019 | Bayyouk |
| 2019/0120389 A1 | 4/2019 | Foster |
| 2019/0136842 A1 | 5/2019 | Nowell |
| 2019/0145400 A1 | 5/2019 | Graham |
| 2019/0145568 A1 | 5/2019 | Nick |
| 2019/0154033 A1 | 5/2019 | Brooks |
| 2019/0170137 A1 | 6/2019 | Chase |
| 2019/0170138 A1 | 6/2019 | Bayyouk |
| 2019/0194786 A1 | 6/2019 | Chuang |
| 2019/0226058 A1 | 7/2019 | Fujieda |
| 2019/0226476 A1 | 7/2019 | Stark et al. |
| 2019/0242373 A1 | 8/2019 | Wernig |
| 2019/0247957 A1 | 8/2019 | Stribling |
| 2019/0264683 A1 | 8/2019 | Smith |
| 2019/0292633 A1 | 9/2019 | Porret |
| 2019/0301314 A1 | 10/2019 | Kamo |
| 2019/0301447 A1 | 10/2019 | Skurdalsvold |
| 2019/0316685 A1 | 10/2019 | Wang |
| 2019/0331245 A1 | 10/2019 | Gable et al. |
| 2019/0360483 A1 | 11/2019 | Nowell |
| 2019/0368614 A1 | 12/2019 | Hurst |
| 2019/0376508 A1 | 12/2019 | Wagner |
| 2020/0023245 A1 | 1/2020 | Story et al. |
| 2020/0056272 A1 | 2/2020 | Hong |
| 2020/0063899 A1 | 2/2020 | Witkowkski |
| 2020/0070034 A1 | 3/2020 | Sukup et al. |
| 2020/0072369 A1 | 3/2020 | Singley et al. |
| 2020/0080660 A1 | 3/2020 | Dyer |
| 2020/0080661 A1 | 3/2020 | Mullins |
| 2020/0132195 A1 | 4/2020 | Coombs |
| 2020/0157663 A1 | 5/2020 | Yang |
| 2020/0158123 A1 | 5/2020 | Chen |
| 2020/0173317 A1 | 6/2020 | Keating |
| 2020/0208776 A1 | 7/2020 | Bayyouk |
| 2020/0217424 A1 | 7/2020 | Rasmussen |
| 2020/0232455 A1 | 7/2020 | Blume |
| 2020/0240531 A1 | 7/2020 | Nowell |
| 2020/0256149 A1 | 8/2020 | Witkowski |
| 2020/0284253 A1 | 9/2020 | Foster |
| 2020/0284365 A1 | 9/2020 | Bayyouk |
| 2020/0290118 A1 | 9/2020 | Chen |
| 2020/0291731 A1 | 9/2020 | Haiderer |
| 2020/0300240 A1 | 9/2020 | Nowell |
| 2020/0300367 A1 | 9/2020 | Caglio et al. |
| 2020/0308683 A1 | 10/2020 | Xue |
| 2020/0347843 A1 | 11/2020 | Mullins |
| 2020/0355182 A1 | 11/2020 | DeLeon |
| 2020/0362970 A1 | 11/2020 | Hurst |
| 2020/0362975 A1 | 11/2020 | Hurst et al. |
| 2020/0392613 A1 | 12/2020 | Won |
| 2020/0393054 A1 | 12/2020 | Fuller |
| 2020/0399979 A1 | 12/2020 | Webster |
| 2020/0400003 A1 | 12/2020 | Webster |
| 2020/0400130 A1 | 12/2020 | Poehls |
| 2020/0400132 A1 | 12/2020 | Kumar |
| 2020/0400140 A1 | 12/2020 | Bayyouk |
| 2020/0400234 A1 | 12/2020 | Mullins et al. |
| 2020/0400242 A1 | 12/2020 | Spencer |
| 2021/0010113 A1 | 1/2021 | Qiao |
| 2021/0010470 A1 | 1/2021 | Blume |
| 2021/0017830 A1 | 1/2021 | Witkowski |
| 2021/0017982 A1 | 1/2021 | Bayyouk |
| 2021/0017983 A1 | 1/2021 | Myers |
| 2021/0025497 A1 | 1/2021 | Tsuji |
| 2021/0040836 A1 | 2/2021 | Baskin |
| 2021/0054486 A1 | 2/2021 | Kim |
| 2021/0062944 A1 | 3/2021 | Lee |
| 2021/0102630 A1 | 4/2021 | Nowell |
| 2021/0108734 A1 | 4/2021 | Nowell |
| 2021/0130936 A1 | 5/2021 | Wu |
| 2021/0146397 A1 | 5/2021 | Mittag et al. |
| 2021/0148471 A1 | 5/2021 | Murugesan |
| 2021/0180156 A1 | 6/2021 | Kim |
| 2021/0190053 A1 | 6/2021 | Wagner |
| 2021/0190223 A1 | 6/2021 | Bayyouk |
| 2021/0197524 A1 | 7/2021 | Maroli |
| 2021/0215071 A1 | 7/2021 | Oikawa |
| 2021/0215154 A1 | 7/2021 | Nowell |
| 2021/0222690 A1 | 7/2021 | Beisel |
| 2021/0230987 A1 | 7/2021 | Tanner |
| 2021/0239111 A1 | 8/2021 | Zitting |
| 2021/0246537 A1 | 8/2021 | Maroli |
| 2021/0260704 A1 | 8/2021 | Hu |
| 2021/0270261 A1 | 9/2021 | Zhang |
| 2021/0285551 A1 | 9/2021 | Renollett |
| 2021/0310484 A1 | 10/2021 | Myers |
| 2021/0381504 A1 | 12/2021 | Wagner |
| 2021/0381615 A1 | 12/2021 | Riedel |
| 2021/0388832 A1 | 12/2021 | Byrne |
| 2022/0026326 A1 | 1/2022 | Wang |
| 2022/0034402 A1 | 2/2022 | Kiani |
| 2022/0056906 A1 | 2/2022 | Lawson et al. |
| 2022/0065063 A1 | 3/2022 | Xu et al. |
| 2022/0163031 A1 | 5/2022 | Chase |
| 2022/0163032 A1 | 5/2022 | Chase |
| 2022/0163118 A1 | 5/2022 | Maffezzoli et al. |
| 2022/0243723 A1 | 8/2022 | Herold et al. |
| 2022/0282719 A1 | 9/2022 | Barnhouse |
| 2022/0320790 A1 | 10/2022 | Demaratos |
| 2022/0349472 A1 | 11/2022 | Ellisor |
| 2022/0390055 A1 | 12/2022 | Ellisor |
| 2022/0403839 A1 | 12/2022 | Mullins |
| 2023/0041201 A1 | 2/2023 | Myers et al. |
| 2023/0129538 A1 | 4/2023 | Miller et al. |
| 2023/0130824 A1 | 4/2023 | Belshan et al. |
| 2023/0184241 A1 | 6/2023 | Avey et al. |
| 2023/0220840 A1 | 7/2023 | Avey et al. |
| 2023/0258175 A1 | 8/2023 | Figgs et al. |
| 2023/0279991 A1 | 9/2023 | Avey et al. |
| 2023/0332596 A1 | 10/2023 | Chase |
| 2023/0383743 A1 | 11/2023 | Brock et al. |
| 2023/0383859 A1 | 11/2023 | Wiegand et al. |
| 2023/0407864 A1 | 12/2023 | Alex et al. |
| 2024/0042627 A1 | 2/2024 | Wang et al. |
| 2024/0102460 A1 | 3/2024 | Kachovskiy et al. |
| 2024/0117882 A1 | 4/2024 | Ellisor |
| 2024/0200656 A1 | 6/2024 | Avey |
| 2024/0200666 A1 | 6/2024 | Leake |
| 2024/0209945 A1 | 6/2024 | Prate et al. |
| 2024/0262067 A1 | 8/2024 | Iversen et al. |
| 2024/0309724 A1 | 9/2024 | Miller et al. |
| 2024/0369139 A1 | 11/2024 | Ellisor |
| 2024/0376892 A1 | 11/2024 | Ellisor |
| 2024/0376984 A1 | 11/2024 | Ellisor |
| 2024/0384795 A1 | 11/2024 | Barnett et al. |
| 2024/0418164 A1 | 12/2024 | Peer |
| 2025/0027486 A1 | 1/2025 | Alex et al. |
| 2025/0052325 A1 | 2/2025 | Berryhill |
| 2025/0075818 A1 | 3/2025 | Xu |
| 2025/0251044 A1 | 8/2025 | Berryhill |
| 2025/0277487 A1 | 9/2025 | Ellisor et al. |
| 2025/0283463 A1 | 9/2025 | Mullins et al. |
| 2025/0283464 A1 | 9/2025 | Ellisor et al. |
| 2025/0305586 A1 | 10/2025 | Mullins et al. |

FOREIGN PATENT DOCUMENTS

| | | |
|---|---|---|
| CN | 102748483 | 10/2012 |
| CN | 202545162 U | 11/2012 |
| CN | 203257342 U | 10/2013 |

(56) References Cited

FOREIGN PATENT DOCUMENTS

| | | |
|---|---|---|
| CN | 204040978 U | 12/2014 |
| CN | 104329464 A | 2/2015 |
| CN | 204738957 U | 11/2015 |
| CN | 205315253 U | 6/2016 |
| CN | 109458326 A | 3/2019 |
| CN | 209261799 U | 8/2019 |
| CN | 209469613 U | 10/2019 |
| CN | 111005695 A | 4/2020 |
| CN | 111073186 A | 4/2020 |
| CN | 102410194 | 4/2021 |
| DE | 3126421 | 1/1983 |
| DE | 102009001560 A1 | 9/2010 |
| DE | 202012104058 U1 | 3/2014 |
| EP | 0 414 955 | 3/1991 |
| EP | 0520567 A1 | 12/1992 |
| EP | 3336356 A1 | 6/2018 |
| EP | 3696408 A1 | 8/2020 |
| GB | 2123100 | 1/1986 |
| GB | 2240592 | 8/1991 |
| JP | 2021025560 A | 2/2021 |
| WO | 2016/024939 | 2/2016 |
| WO | 2021195572 | 9/2021 |
| WO | 2022167341 A1 | 8/2022 |
| WO | 2024026432 | 2/2024 |
| WO | 2024076786 A1 | 4/2024 |

OTHER PUBLICATIONS

Claim Chart for U.S. Pat. No. 6,544,012, 23 pages.
Claim Chart for U.S. Pat. No. 7, 186,097, 22 pages.
Claim Chart for U.S. Pat. No. 7,845,413, 8 pages.
Claim Chart for U.S. Pat. No. 9,534,472, 8 pages.
Claim Chart for U.S. Pat. Pub. No. 2013/0319220, 17 pages.
Claim Chart for U.S. Pat. Pub. No. 2014/0348677, 10 pages.
Claim Chart for U.S. Pat. Pub. No. 2015/0132157, 23 pages.
U.S. Pat. No. 10,288, 178, 353 pages.
U.S. Pat. No. 10,519,950, 142 pages.
U.S. Pat. No. 10,591,070, 168 pages.
U.S. Appl. No. 16/722, 139, 104 pages.
U.S. Appl. No. 13/773,271, 250 pages.
U.S. Appl. No. 15/719,124, 183 pages.
U.S. Appl. No. 16/814,267, 194 pages.
U.S. Appl. No. 17/120,121, 110 pages.
U.S. Appl. No. 62/234,483, 45 pages.
U.S. Appl. No. 62/315,343, 41 pages.
U.S. Appl. No. 62/318,542, 44 pages.
U.S. Appl. No. 62/346,915, 41 pages.
U.S. Appl. No. 62/379,462, 24 pages.
DiaCom Corporation, "Diaphragm Design Guidebook", 28 pages, 2018.
Vulcan, High-Impact Replacement Parts, Fortified Valves and Seats, found at: https://www.vulcanindustrial.com/energy-products/replacement-parts, 2021.

SELF-LOCKING PLUG

CROSS REFERENCE TO RELATED APPLICATIONS

This application is a continuation of U.S. Non-Provisional application Ser. No. 18/540,973, filed Dec. 15, 2023, titled "SELF-LOCKING PLUG," which is a continuation of U.S. Non-Provisional application Ser. No. 17/405,321, filed Aug. 18, 2021, titled "SELF-LOCKING PLUG," now U.S. Pat. No. 11,846,356, issued Dec. 19, 2023, the disclosures of which are incorporated herein by reference in their entireties.

TECHNICAL FIELD

Embodiments of the subject matter disclosed herein generally relate to pump systems, and in particular to pump systems including one or more plugs.

BACKGROUND

Pumping systems may be used in a variety of applications, such as industrial applications where pumping systems are used to elevate a working fluid pressure. One such application is hydraulic fracturing systems, where high pressure pumps are used to increase a fluid pressure of a working fluid (e.g., fracturing fluid, slurry, etc.) for injection into an underground formation. The working fluid may include particulates, which are injected into fissures of the formation. When the fluid is removed from the formation, the particulates remain and "prop" open the fissures, facilitating flow of oil and gas. In many applications, reciprocating pumps are used where a fluid is introduced into a fluid end inlet passage and driven out through an outlet passage. A plunger reciprocates within a bore to add energy to the fluid. The pressure and operating conditions of the pumps may lead to movement and load cycling at various interfaces, which may cause leaks or other operational problems.

SUMMARY

Applicant recognized the problems noted above herein and conceived and developed embodiments of systems and methods, according to the present disclosure, for plugs, and in various embodiments, fluid ends containing one or more plugs at different sealing interfaces.

In accordance with one or more embodiments, a fluid end, includes a plunger reciprocating within a first bore, the plunger increasing a pressure of a fluid within a pressure chamber. The fluid end also includes a second bore. The fluid end further includes a plug assembly associated with the second bore. The plug assembly includes a plug body positioned within the second bore. The plug assembly also includes a lock ring positioned, at least in part, within the second bore, the lock ring positioned to be driven radially outward responsive to a longitudinal force applied to the plug body.

In accordance with another embodiment, a plug assembly includes a plug body. The plug assembly also includes a lock ring positioned circumferentially about the plug body, at least a portion of the lock ring overlapping the plug body in both a deactivated position and an activated position. The plug assembly further includes a retaining plate arranged proximate the lock ring, the lock ring positioned between the plug body and the retaining plate. The plug assembly also includes a fastener extending, at least part, through the retaining plate and coupling to the plug body. The plug body is transitioned between the deactivated position and the activated position responsive to an axial force applied, at least in part, by the fastener, the axial force driving the plug body toward the retaining plate to transition an arm of the lock ring radially outward.

In accordance with another embodiment, a method includes positioning a plug body within a bore in a deactivated position. The method further includes applying an axial force to the plug body, the axial force being in a direction toward an outlet of the bore. The method also includes causing, responsive to the axial force, a lock ring positioned about the plug body to transition, at least in part, radially outward into a groove formed along the bore.

BRIEF DESCRIPTION OF THE DRAWINGS

The present technology will be better understood on reading the following detailed description of non-limiting embodiments thereof, and on examining the accompanying drawings, in which.

DETAILED DESCRIPTION

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

When introducing elements of various embodiments of the present disclosure, the articles "a", "an", "the", and "said" are intended to mean that there are one or more of the elements. The terms "comprising", "including", and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments", or "other embodiments" of the present disclosure are not intended to be interpreted as excluding the existence of additional embodiments that also incorporate the recited features. Furthermore, reference to terms such as "above", "below", "upper", "lower", "side", "front", "back", or other terms regarding orientation or direction are made with reference to the illustrated embodiments and are not intended to be limiting or exclude other orientations or directions. Additionally, like reference numerals may be used for like components, but such use is for convenience purposes and not intended to limit the scope of the present disclosure. Moreover, use of terms such as substantially or approximately may refer to +/−10 percent.

Embodiments of the present disclosure are directed toward systems and methods to install and maintain plugs within one or more openings of a pumping unit, such as a fracturing pump. In at least one embodiment, configurations are directed toward plugs in one or both of a discharge side or a suction side of the pump. In at least one embodiment, plugs may include a configuration to facilitate self-locking, where a pressure applied from an interior portion of the pump drives one or more portions of the plug into a body of the fluid end to increase loading on the plug, thereby reducing a likelihood of leakage. Accordingly, systems and methods of the present disclosure may be directed toward plugs that are not reliant on axial loading from an external fastener or with threaded fasteners arranged along a bore, but rather, utilize configurations where a sealing or locking force increases responsive to an increased pressure within a fluid end.

Various embodiments of the present disclosure are directed toward one or more plugs that include a seal, which may be a piston-style seal. In at least one embodiment, the seal may be arranged around a portion of the plug to align with and engage a sealing surface. Moreover, systems and method include a lock ring, which in various embodiments may be a segmented lock ring. That is, the lock ring may include one or more portions that are positioned circumferentially about at least a portion of a plug body. Furthermore, various embodiments may also include a retainer or limiter plate, which may be utilized to limit or reduce axial motion, along with one or more engaging fasteners, which in various embodiments may include an elevator stud and a nut. In operation, the plug body may be driven into the bore until the seal engages the bore, which in one or more embodiments utilizes an external force to facilitate alignment and positioning. Thereafter, the nut may be rotated on the elevator stud such that the plug body is driven outwards, which may engage the lock ring (or segments of the lock ring) on a tapered surface, thereby driving the lock ring and/or segments radially outward and into a mating groove formed in the fluid end. As axial movement of the plug in an outward direction decreases, the plug provides more energizing force to the lock ring and/or segments. In one or more embodiments, the lock ring and/or segments may be retained on the limiting plate, for example using one or more mechanical fasteners, or may be geometrically constrained between the plug and the plate.

Embodiments of the present disclosure may overcome problems with existing plug or suction covers. By way of example, traditional approaches involve inserting a plug into a bore and then threaded a retainer into the fluid housing. This approach leads to failure because of an inability to generate enough loading to prevent movement of the plug and load cycling on the threads, and as a result, an interface will eventually crack or peel, which renders the fluid end inoperable. Attempts to solve these problems are also insufficient, such as using a captured drive screw against a threaded locking collar. This configuration relies on a threaded interface between the locking collar and the fluid end body, and any applied pressure will not further energizing the locking mechanism, but will either be resisted or failure in a similar way as traditional designs. As with the traditional approach, performance is dependent on an amount of torque applied to the drive bolt. Further attempts to overcome problems with traditional configurations include using a custom retaining nut that uses drive screws to load threads along the nut that engage the fluid end body. Once again, this configuration also relies on the amount of torque applied to the threaded members used to energize the assembly. Another attempt to overcome these problems includes utilizing opposite-facing edge components that are energized using a threaded fasteners. This configuration suffers from the same problems where failure at the threaded components will reduce loading on the entire design. Further configurations have attempted to integrate the retainer with the plug, which also relies on the threaded interface between the retainer/plug combo and the fluid end or to include a retainer that includes projections that generate a downward force when rotated into place, where vibrations may cause loosening and failure of the system. Systems and methods of the present disclosure have identified these problems and have created one or more configurations to overcome existing problems with respect to plugs utilized with pumping units, among other others.

Embodiments of the present disclosure are directed toward systems and methods to overcome problems with plugs utilized with pumping units. Unlike plug configurations that depend on linearly applied forces to account applied pressures, wedges to generate a mechanical advance, integrated plug/retainer combinations, and rotational tapers to generate preloads, present disclosure configurations may utilize the natural outward (e.g., away from the chamber) pressure of the fluid end in order to create more preload on the plug. As a result, the plug may continuously wedge into lock ring and/or segments.

Various embodiments of the present disclosure include the limiting or retention plate for the lock ring and/or segments that may be directly attached to the plug body or may be a separate assembly. The segments may be designed such that they move radially outwards from the retention plate. The segments may have a stepped taper or may be a single continuous taper. The plug is designed to come to a hard stop against the segments when full travel has been achieved and may not pass through them. When fully loaded, the plug is configured to not pass an axial load into the retention plate. The elevator fastener that is used to initially engage the plug into the segments may be a stud and nut or a bolted fastener. In one or more embodiments, a variety of retention mechanisms may be utilized with systems and methods of the present disclosure.

Figure 1:
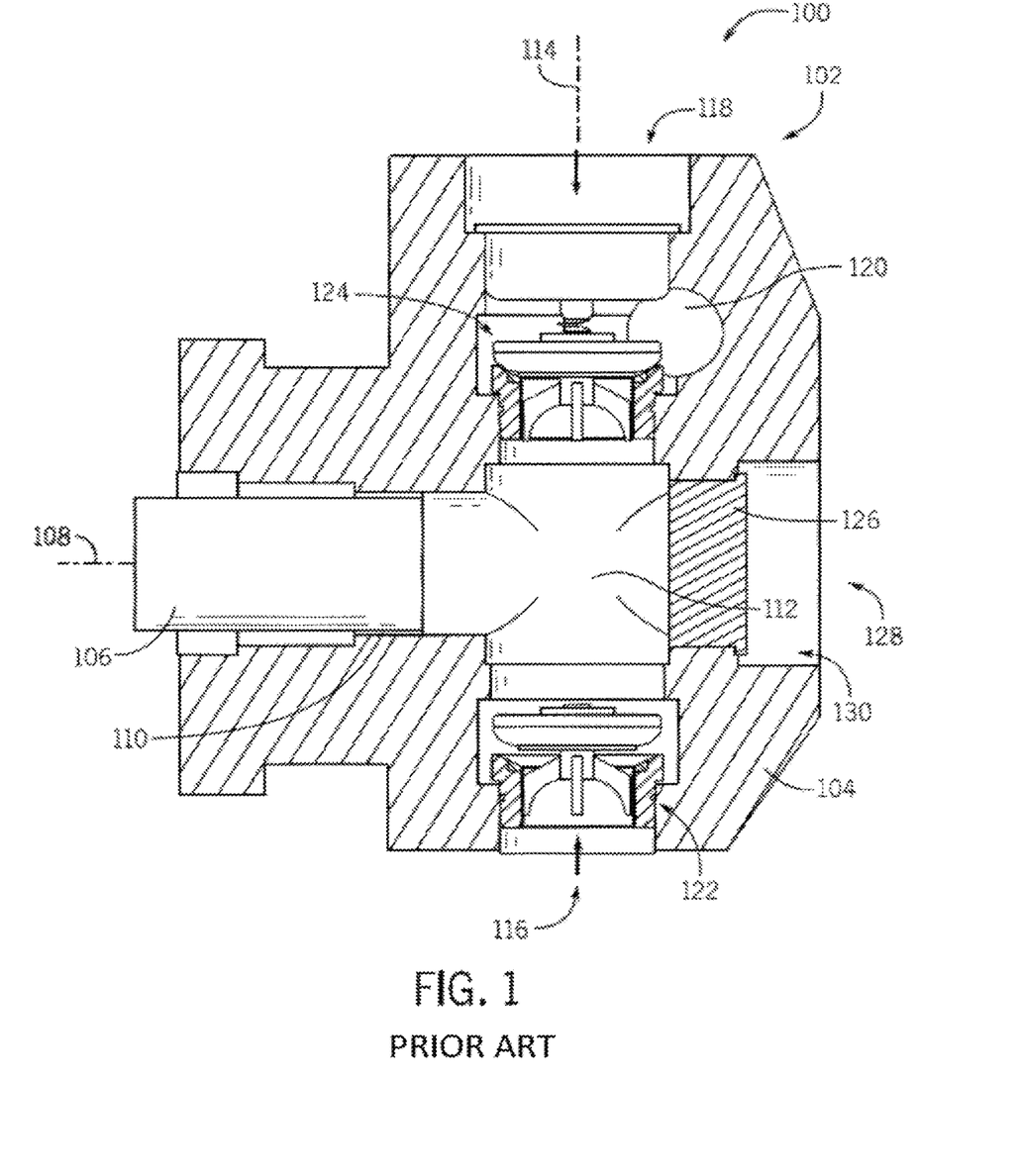
FIG. 1 is a schematic cross-sectional view of an embodiment of a pump assembly, in accordance with embodiments of the present disclosure.

FIG. 1 is a schematic cross-sectional view of an embodiment of a pump assembly 100, which may also be referred to as a reciprocating pump assembly and/or a reciprocating pump. The pump assembly 100 may be utilized during hydraulic fracturing operations, among other operations, where a working fluid (e.g., fracturing fluid, slurry, etc.) is introduced into the pump and energy is added to the working fluid to increase a pressure of the working fluid. Fracturing fluid, by way of example only, may include corrosives and also particulates, such as sand or ceramics, which are utilized during fracturing operations. These corrosives and particulates cause erosion within the pump assembly 100, which may undesirably affect fracturing operations and lead to down times to replace various components. Additionally, the fracturing fluids may include corrosive acids and the like, which may wear down components of the pump assembly 100.

It should be appreciated that various components of the pump assembly 100 have been removed for clarity with the following discussion. For example, a power end has been removed in favor of focusing on the illustrated fluid end 102 of the pump assembly 100. The power end may include a crankshaft that is driven by an engine or motor to facilitate operations. The fluid end 102 includes a fluid end block 104 that may house one or more components discussed herein. A plunger rod 106 is driven (e.g., via the crankshaft) to reciprocate within the fluid end block 104 along a plunger axis 108. The plunger rod 106 is positioned within a bore 110 extending through at least a portion of the fluid end block 104. The illustrated bore 110 is arranged along the plunger axis 108 (e.g., first axis) and intersects a pressure chamber 112, which is arranged along a pressure chamber axis 114 (e.g., second axis), which is positioned substantially perpendicular to the plunger axis 108. It should be appreciated that the pump assembly 100 may include multiple plunger rod and pressure chamber arrangements, which may be referred to as a plunger throw. For example, the pump assembly 100 may be a triplex pump, quadplex pump, quintuplex pump, and the like.

The illustrated fluid end block 104 includes an inlet passage 116 and an outlet passage 118, which are generally coaxial and arranged along the pressure chamber axis 114. In other words, the inlet passage 116 and the outlet passage 118 are axially aligned with respect to one another and/or the pressure chamber 112. In various embodiments, fluid enters the pressure chamber 112 via the inlet passage 116, for example on an up stroke of the plunger rod 106, and is driven out of the pressure chamber 112 to an outlet chamber 120, for example on a down stroke of the plunger 106.

Respective valve assemblies 122, 124 are arranged within the inlet passage 116 and the outlet passage 118. These valve assemblies 122, 124 are spring loaded in the illustrated embodiment, but it should be appreciated that such an arrangement is for illustrative purposes only. In operation, a differential pressure may drive movement of the valve assemblies. For example, as the plunger rod 106 is on the upstroke, pressure at the inlet passage 116 may overcome the spring force of the valve assembly 122, thereby driving fluid into the pressure chamber 112. However, on the down stroke, the valve assembly 122 may be driven to a closed position, while the spring force of the valve assembly 124 is overcome, thereby enabling the fluid to exit via the outlet chamber 120.

Further illustrated in FIG. 1 is a suction cover 126 (e.g., plug, suction cover plug, suction plug) positioned at a suction end 128 of the fluid end 102. In this example, the suction cover 126 extends into a bore 130 and may be retained within the bore 130 using a retainer (not pictured). The retainer may be threaded into the fluid end block 104 and may maintain the suction cover 126 position during operations. As noted above, in operation, pressure within the pressure chamber 112 may act against the suction cover 126 to drive the suction cover 126 in an axially outward direction. The retainer prevents such movement of the cover 126, but over time, the threaded connection between the retainer and fluid end block 104 may break down. Systems and methods of the present disclosure are directed toward a suction plug configuration that utilizes the axial force from the pressure chamber 112 in order to increase a loading on the retainer, thereby maintaining a position of the suction cover 126. Various embodiments of the present disclosure may include a lock ring that includes one or more segments and tapered surfaces that interact with tapered surfaces of the suction cover 126 in order to drive radially outward movement of the lock ring. This outward movement may drive the retainer into a groove or opening within the fluid end, thereby maintaining the position of the suction cover 126, even as pressure increases.

Figure 2:
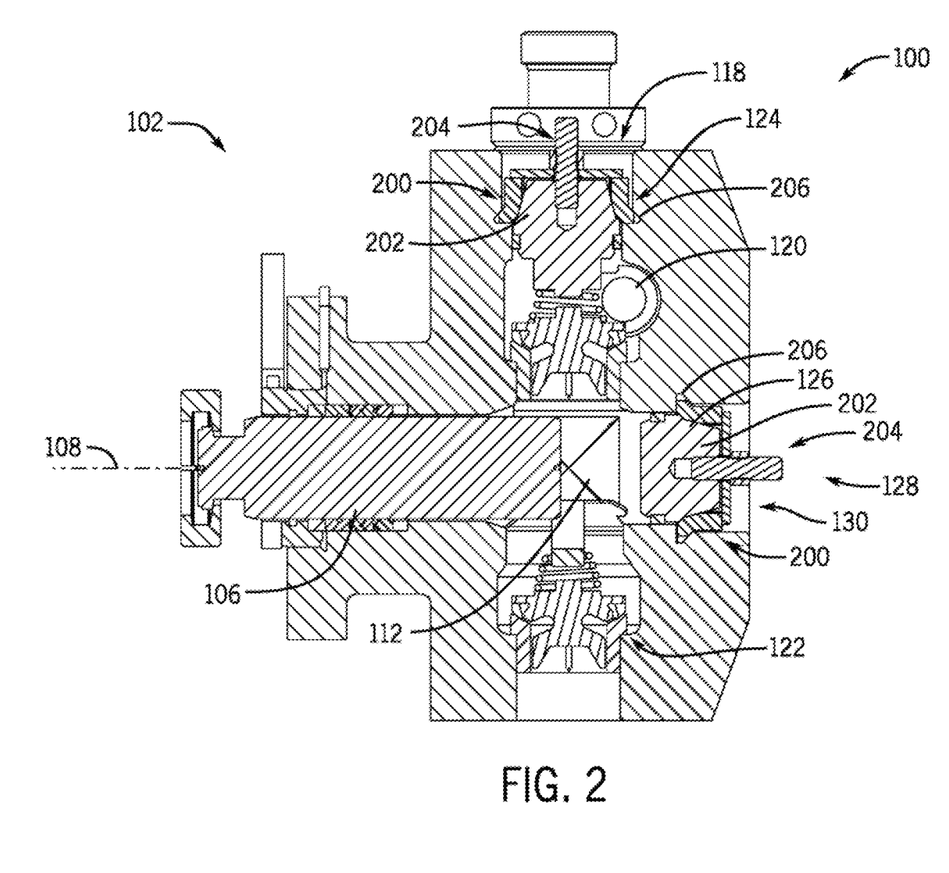
FIG. 2 is a schematic cross-sectional view of an embodiment of a pump assembly, in accordance with embodiments of the present disclosure.

FIG. 2 is a schematic cross-sectional view of an embodiment of the pump assembly 100 incorporating one or more plug assemblies 200, in accordance with one or more embodiments of the present disclosure. As noted, like numerals may be used for like components for convenience, but such use should not be interpreted as limiting the scope of the present disclosure. In this example, the pump assembly 100 includes the fluid end 102 with the plunger 106 that reciprocates along the axis 108. Further shown are the inlet and outlet valve assemblies 122, 124 along with the suction cover 126 arranged within the suction bore 130. In one or more embodiments, the illustrated suction cover 126 may form at least a portion of the plug assembly 200. As noted above, in operation reciprocation of the plunger 106 may increase a pressure within the pressure chamber 112 to drive fluid out of the outlet chamber 120.

In one or more embodiments, plug assemblies 200 are arranged at each of the suction bore 130 and the outlet passage 118 (e.g. discharge side). It should be appreciated that this configuration is shown by way of example only, and that plug assemblies 200 may not be at each of the illustrated locations and/or may be at additional locations. In this example, the plug assemblies 200 include a plug body 202, which may correspond to a suction cover 126 with respect to the assembly 200 at the suction end 128. The plug bodies 202 extend into respective bores to seal against a bore wall. Further illustrated is a retaining assembly 204, which will be described in more detail below, that engages and maintains an axial position of the plug bodies 202. In operation, one or more components of the retaining assembly 204 may, responsive to an axial force of the fluid, be driven radially outward to engage one or more grooves 206 within the fluid end block 104, and as a result, may be locked or otherwise secured within the bore. Accordingly, increased pressures or load cycling may result in a more rigid or improved retaining configuration with respect to the plug bodies 202. In this manner, systems and methods may be utilized to retain the respective plug bodies 202 without directly threading to the fluid end block 104.

Figure 3:
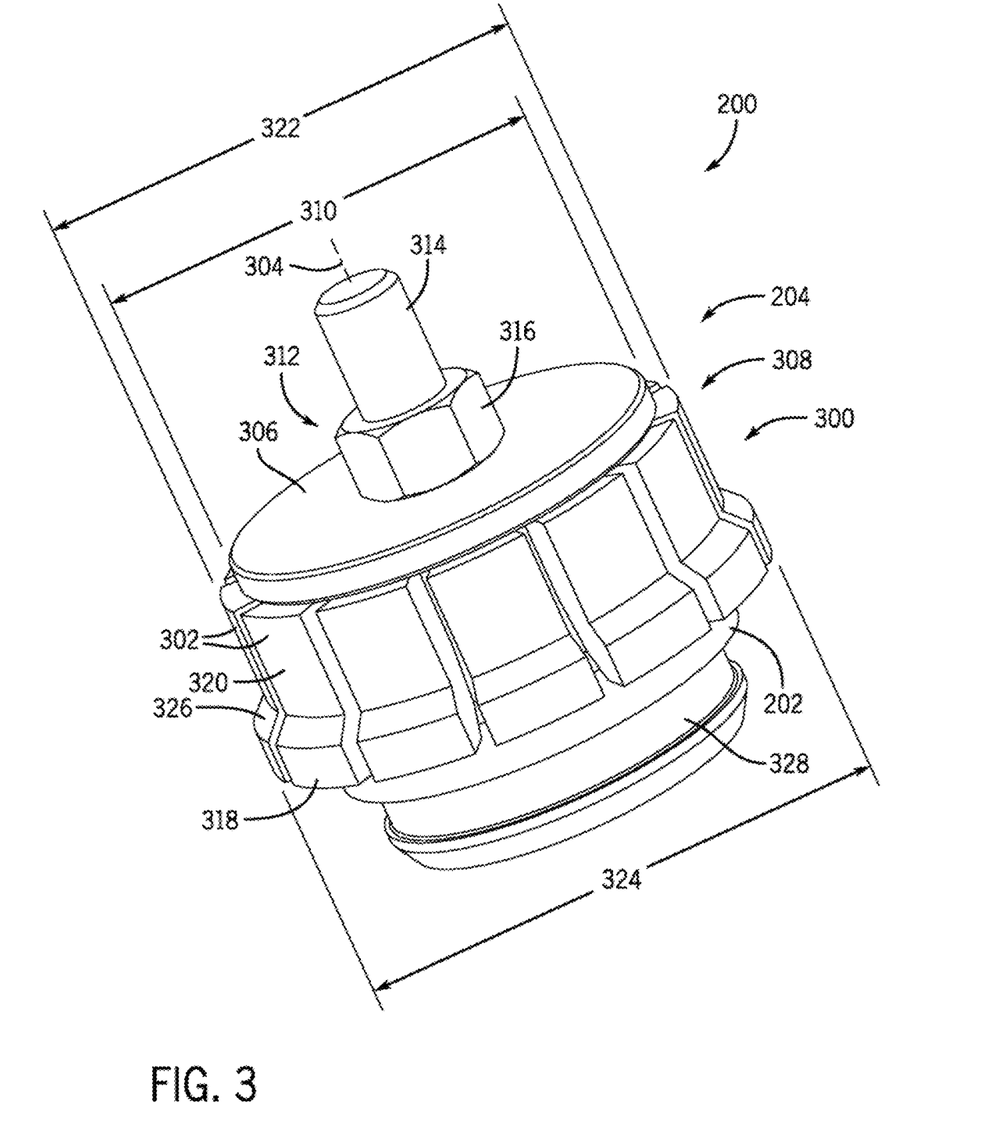
FIG. 3 is a perspective view of an embodiment of a plug assembly, in accordance with embodiments of the present disclosure.

FIG. 3 is a perspective view of an embodiment of the plug assembly 200. The illustrated configuration includes the plug body 202 and the retaining assembly 204, which is shown as being positioned, at least in part, circumferentially about the plug body 202.

In at least one embodiment, the retaining assembly 204 includes a lock ring 300 (e.g., locking ring, ring), which in this configuration is a segmented ring that includes a plurality of locking segments 302 (e.g., lock ring segments, lock segments, segments) arranged circumferentially about a retaining axis 304. It should be appreciated that the locking segments 302 illustrated in FIG. 3 are for illustrative purposes only and that, in other embodiments, there may be more or fewer segments 302. For example, the lock ring 300 may be a continuous piece. Additionally, in another embodiment, the lock ring 300 may include segments that have different circumferential extents. That is, each of the locking segments 302 may not be the same size or shape. For example, alternating segments 302 may have different circumferential extents, different shapes, different tapers, and the like. Accordingly, various geometric features of the lock ring 300 and/or segments 302 may be adjusted and/or particularly selected for a variety of different operating conditions.

The lock ring 300 is positioned axially lower than a retaining plate 306 (e.g., retainer plate, limiting plate). The retaining plate 306 is shown here as a substantially flat or planar plate, but it should be appreciated that different shapes may be utilized. For example, in at least one embodiment, the retaining plate 306 may be a ring. Additionally, in one or more embodiments, the retaining plate 306 may segmented or divided with spaces between solid sections. The retaining plate 306 is arranged at a top end 308 of the segments 302 and has a retaining plate diameter 310 that overlaps, at least in part, the top ends 308 of the segments 302. As a result, axial movement of the retaining plate 306 may be transferred to the segments 302 and/or axial movement of the segments 302 may be blocked beyond a predetermined point by the retaining plate 306. It should be appreciated that various embodiments may include a mechanical fastener or other coupling device between the retaining plate 306 and the segments 302. For example, a bolt or other threaded fastener may couple the components together. Additionally, in other embodiments, one or more hinged or multi-axis coupling devices may also be used to facilitate radially outward movement of the segments 302, as will be described below. Furthermore, in configurations, tongue and groove fittings, among other options, may enable movement of the segments 302 with respect to the retaining plate 306. Additionally, it should be appreciated that certain embodiments may omit a coupling or fastener between segments 302 and the retaining plate 306 and that geometric features may be used to maintain positions of respective components relative to one another, such as various lips, grooves, extensions, and the like.

Further illustrated is an engagement system 312, which in this configuration includes one or more fasteners, such as, for example, an elevator stud 314 and a nut 316. It should be appreciated that such a configuration is for illustrative purposes and other configurations may include different engaging mechanisms, such as other threaded fittings, bayonet connections, clamps, spring-loaded couplings, and the like. In operation, the nut 316 may be rotated about the axis 304 to draw the plug body 202 up and along the elevator stud 314, which causes the plug body 202 to engage the segments 302 of the lock ring 300.

In at least one embodiment, the segments 302 include respective arms 318 that extend radially outward from a segment body 320. That is, a segment outer diameter 322 is less than an arm outer diameter 324. As will be described below, the arms 318 may be utilized to engage the grooves 206 (FIG. 2) formed within the fluid end block 104 (FIG. 2). In this example, the arms 318 include an outer taper 326 that marks a transition between the segment outer diameter 322 and the arm outer diameter 324. It should be appreciated that a length and/or an angle the outer taper 326 may be particularly selected based on one or more design conditions. Moreover, in various embodiments, each of the segments 302 may have different sized or shaped arms 318. For example, different arms 318 may have different outer taper 326 shapes or sizes. Moreover, different arms 318 may have different arm outer diameters 324, among other potential design configurations.

In this example, the plug body 202 includes a seal groove 328 to receive a seal (not pictured), such as a piston seal. In various embodiments, the plug body 202 may include multiple grooves 328 to receive multiple seals. It should be appreciated that embodiments having the seal (not pictured) associated with the plug body 202 are for illustrative purposes only and that, in other embodiments, or in addition to the seal associated with the plug body 202, there may be one or more seals formed along a bore that engages portions of the plug body 202, such as one or more scaling surfaces. As will be described below, in operation the plug body 202 may be installed within a bore to engage the seal. Thereafter, the retaining assembly 204 may be utilized to drive the plug body 202 axially out of the bore such that one or more portions of the plug body 202 engages the lock ring 300, which may drive portions of the lock ring 300 radially outward to engage grooves 206 (FIG. 2). This engagement may lock or otherwise position the plug body 202 within the bore. Furthermore, responsive to axial forces applied by fluid pressures, further axial movement of the plug body 202 may serve to drive the lock ring 300 further outward and into the grooves 206 (FIG. 2), which may then lock or otherwise maintain the position of the plug body 202.

Figure 4:
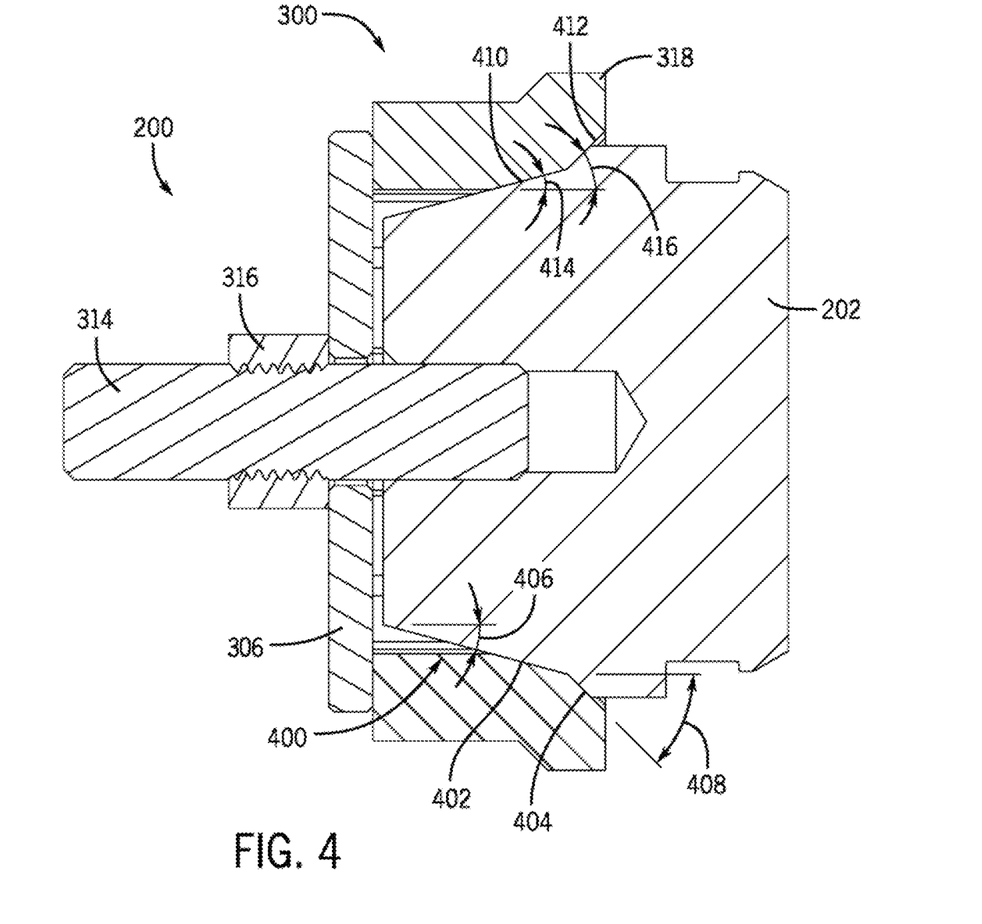
FIG. 4 is a schematic cross-sectional view of an embodiment of a plug assembly, in accordance with embodiments of the present disclosure.

FIG. 4 is a cross-sectional view of an embodiment of the plug assembly 200. In this example, the plug body 202 is positioned to bear against or otherwise contact the lock ring 300, which may be responsive to rotation of the nut 316 to drive the plug body 202 toward the retaining plate 306. As shown, the elevator stud 314 is secured to the plug body 202, which may be via one or more threaded connections, an interference fit, a spring-loaded pin, or the like. As will be appreciated, the internal location of the connection may not be subjected to the particulate-laden or corrosive nature of the fluid utilized during operations.

The plug body 202 includes a top end 400, a first tapered profile 402, and a second tapered profile 404. It should be appreciated that additional tapers or steps may be included along the plug body 202 and that the illustrated configuration is by way of example. As shown, the first tapered profile 402 is arranged at a first profile angle 406 and the second tapered profile 404 is arranged at a second profile angle 408, with the first profile angle 406 being different from the second profile angle 408. It should be appreciated that in various embodiments the first profile angle 406 may be larger than the second profile angle 408, may be less than the second profile angle 408, or may be substantially equal to the second profile angle 408.

As shown, the respective tapered profiles 402, 404 of the plug body 202 engage mating profiles of the lock ring 300. For example, the illustrated segments 302 each include a first lock ring tapered profile 410 and a second lock ring tapered profile 412, which each of the first and second lock ring tapered profiles 410, 412 are arranged at respective first and second lock ring profile angles 414, 416, with the first lock ring profile angle 414 being different from the second lock ring profile angle 416. In various embodiments, the respective profiles 402, 404 may correspond to the profiles 410, 412 to facilitate engagement and movement of the arms 318 radially outward. That is, dimensions of the profiles 402, 404 may be particularly selected and based, at least in part, on the profiles 410, 412 to enable engagement between the plug body 202 and the lock ring 300 to drive the lock ring 300 radially outward responsive to an axial force applied to the plug body 202.

In the illustrated example, one or more limiting features may be included to prevent movement of one or more components beyond a predetermined location. By way of example, as noted above, the retaining plate 306 may be rigidly coupled or secured to the lock ring 300, and as a result, axial movement of the plug body 202 may be blocked by the retaining plate 306. Furthermore, as shown, the differences between the profile 402, 404 and the profiles 410, 412 may be particularly configured such that the pressures needed to move the second tapered profile 404 toward the first lock ring tapered profile 410 would exceed pressures utilized during operation of the pump. Furthermore, in various embodiments, one or more clamps or fasteners may secure the retaining plate 306 to a face of the fluid end, among other potential configurations, in order to provide additional prevention for axial movement of the plug body 202. Additionally, it should be appreciated that one or more components of the engagement system 312 may also be secured, at least in part, to a face of the fluid end.

Figure 5A:
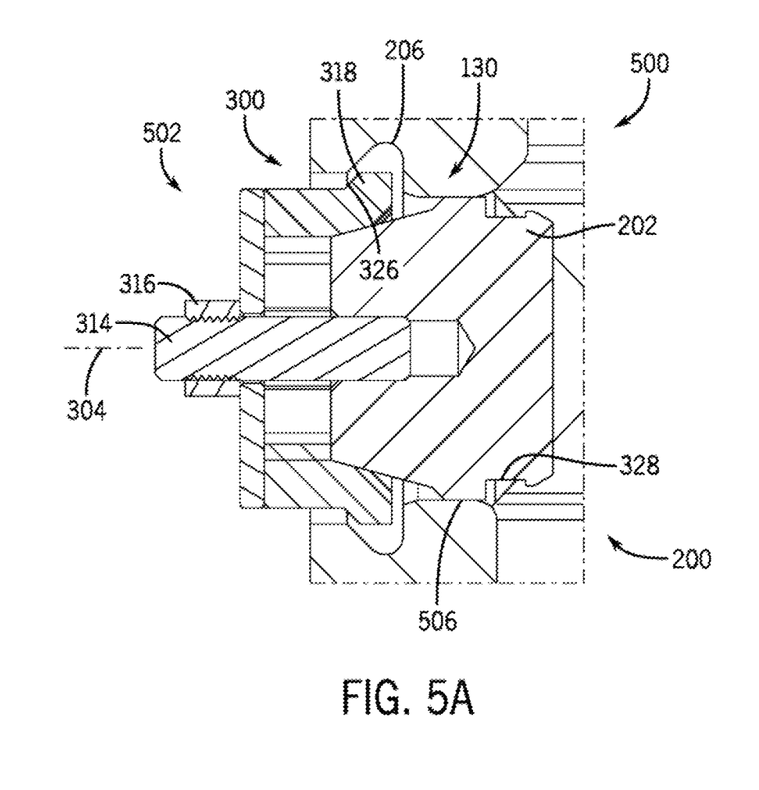
FIGS. 5A and 5B are schematic cross-sectional views of embodiments of a plug assembly, in accordance with embodiments of the present disclosure.
Figure 5B:
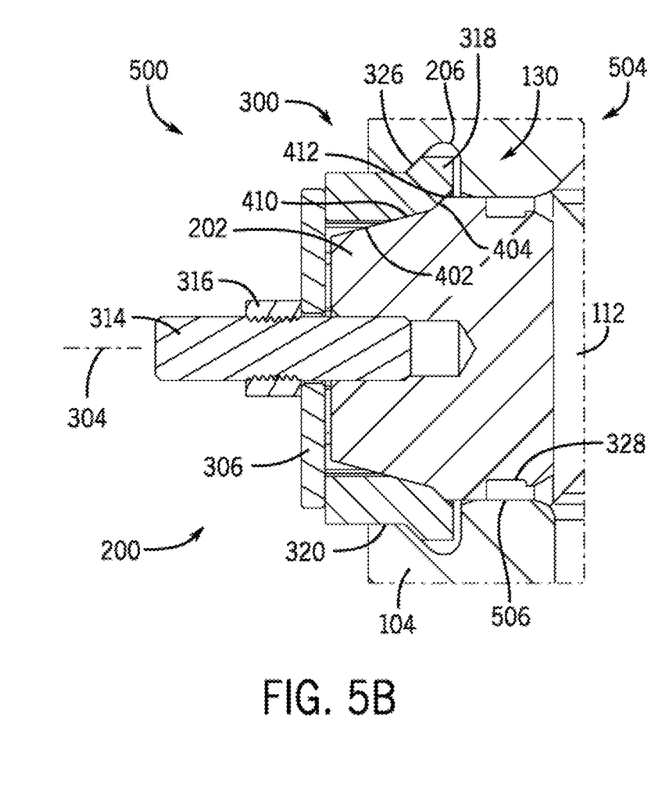

FIGS. 5A and 5B illustrate an activation sequence 500 where the plug assembly 200 is transitioned from an deactivated position 502 to an activated position 504. It should be appreciated that the deactivated position 502 refers to a position where the plug body 202 is in a position where the arms 318 are engaged less than a threshold amount. FIG. 5A illustrates the plug body 202 coupled to the elevator stud 314 (or any other retaining mechanism). In this example, the plug body 202 is arranged within the bore 130 such that the seal groove 328 is not aligned with the bore wall 506. That is, the seal groove 328, which will receive a seal (not pictured) is positioned axially inward toward the pressure chamber 112 prior in the deactivated position 502. As will be described, the plug body 202 may then be axially driven outwardly along the retaining axis 304 to position the seal groove 328 in line with the bore wall 506.

Further shown in the deactivated position is engagement between the plug body 202 and the lock ring 300. Specifically, this example shows the first tapered profile 502 engaged with the first lock ring tapered profile 410. However, there is no engagement between the profiles 404, 412. As will be described, engagement between more areas of the plug body 202 and the lock ring 300 may be facilitated by an axial force applied to the plug body 202 to drive the plug body 202 along the retaining axis 304.

In various embodiments, the groove 206 is formed within the fluid end block 104 to receive the arms 318. In this example, at least a portion of the arms 318 extend within the groove 206. However, as shown in FIG. 5B, the outer taper 326 is not engaged with the groove 206 in the configuration of FIG. 5A, further illustrating the deactivated position 502. It should be appreciated that, in various embodiments, a distance the arms 318 extend into the grooves 206 may be particularly selected based, at least in part, on anticipated design configurations.

FIG. 5B illustrates the transition to the activated position 504. For example, in at least one embodiment, rotation of the nut 316 may apply an axial force to the plug body 202 to move the plug body 202 along the retaining axis 304 such that the groove 328 (and unpictured seal) are aligned with the bore wall 506. As the plug body 202 moves along the retaining axis 304, the first tapered profile 402 may slide along the first lock ring tapered profile 410, thereby driving the lock ring 300 radially outward with respect to the retaining axis 304. That is, the arm 318 is driven radially outward and into the groove 206. Furthermore, as shown, as the plug body 202 continues to move along the retaining axis 304 the second tapered profile 404 is engages the second lock ring tapered profile 412, which may further drive the arm 318 outward and into the groove 206. In this example, movement of the plug body 202 is stopped prior to reaching the retaining plate 306, but it should be appreciated that other embodiments may be configured such that the plug body 202 contacts the retaining plate 306.

Further shown in the illustrated embodiment is engagement between the body 320 and the fluid end block 104. In other words, the outward movement of the arms 318 also drives outward movement of the body 320 to engage the fluid end block 104. It should be appreciated that, in other configurations, the body 320 may not contact the fluid end block 104, and instead, the arms 318 may bend or otherwise bow outward such that the body 320 does not contact the fluid end block 104. Additionally, in various configurations, a coupling between the body 320 and the retaining plate 306 may block outward movement of the body 320, but enables bending or movement of the arm 318. Additionally, as noted above, in certain embodiments the body 320 is not coupled to the retaining plate 306, and rather geometric features may be utilized to maintain position of the various features of the plug assembly 200.

In the activated position 504, further axial forces from the pressure chamber 112 may drive the tapered profiles 402, 404 against the mating tapered profiles 410, 412 and further drive the arms 318 outward and into the groove, thereby locking or otherwise maintaining the plug body 202 position. As noted above, such a configuration may accommodate loading and load cycling without directly threading the lock ring 300 within the bore 130, thereby reducing a likelihood of failure at a threaded interface.

Figure 6:
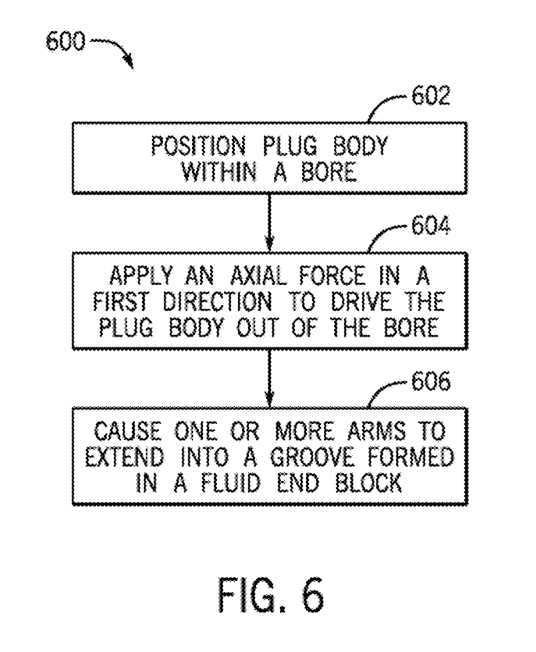
FIG. 6 is a flow chart of an embodiment of a method for installing a plug assembly, in accordance with embodiments of the present disclosure.

FIG. 6 is a flow chart of an embodiment of a method 600 for installing a plug within a bore. It should be appreciated for this method, and all methods described herein, that there may be more or fewer steps. Additionally, the steps may be performed in a different order, or in parallel, unless otherwise specifically stated. In this example, a plug body is positioned within a bore 602. In various embodiments, the plug body is positioned such that a seal of the plug body is not aligned with a sealing surface of the bore, for example, the plug body may be arranged within the bore such that the plug body is farther into the bore than in an operating condition. In at least one embodiment, an axial force is applied to the plug body 604. In at least one embodiment, the axial force is from a retaining assembly that may include one or more fasteners, such as a stud and nut, that may be utilized to apply an axial force to drive the plug out of the bore. By way of example, the plug may be driven out of the bore such that a seal aligns with a sealing surface of the bore. In at least one embodiment, driving the plug body outward causes one or more arms of a lock ring to extend into a groove 606. By way of example, mating tapered surfaces may contact one another to radially drive the arms outward and into the groove, thereby locking the plug body into position. In this manner, a self-locking plug may be installed within a bore, such as a bore associated with a pump.

This application is a continuation of U.S. Non-Provisional application Ser. No. 18/540,973, filed Dec. 15, 2023, titled "SELF-LOCKING PLUG," which is a continuation of U.S. Non-Provisional application Ser. No. 17/405,321, filed Aug. 18, 2021, titled "SELF-LOCKING PLUG," now U.S. Pat. No. 11,846,356, issued Dec. 19, 2023, the disclosures of which are incorporated herein by reference in their entireties.

The foregoing disclosure and description of the disclosed embodiments is illustrative and explanatory of the embodiments of the disclosure. Various changes in the details of the illustrated embodiments can be made within the scope of the appended claims without departing from the true spirit of the disclosure. The embodiments of the present disclosure should only be limited by the following claims and their legal equivalents.

The invention claimed is:
1. A fluid end comprising:
a first bore;
a plunger to reciprocate within the first bore;
one or more additional bores; and one or more plug assemblies associated with the one or more additional bores, each of the one or more plug assemblies comprising:
  a plug body positioned within the one or more additional bores, the plug body including a first tapered profile and a second tapered profile, and
  one or more rings having at least portions thereof positioned within the one or more additional bores, the one or more rings having a lock ring including a first lock ring tapered profile and a second lock ring tapered profile, and the lock rings also positioned such that the first tapered profile of the plug body engages the first lock ring tapered profile and the second tapered profile of the plug body engages the second lock ring tapered profile, thereby to drive the lock rings responsive to an axial force when applied to the plug body.

2. The fluid end of claim 1, further comprising:
one or more retaining assemblies, each of the one or more retaining assemblies comprising:
  the one or more rings, one of the one or more rings comprising a retaining plate,
  a fastener extending through the retaining plate and connected to the plug body of the one or more plug assemblies, and
  a nut positioned to apply the axial force to the plug body of the one or more plug assemblies and responsive to rotation about the fastener, thereby to drive the plug body out of the one or more additional bores.

3. The fluid end of claim 1, wherein the lock rings includes a plurality of segments.

4. The fluid end of claim 1, further comprising a groove positioned in the fluid end, and wherein the lock ring further includes: (a) a lock ring body, and (b) an arm extending radially outward from the lock ring body and positioned to engage the groove when the one or more plug assemblies is in an activated position.

5. The fluid end of claim 1, wherein the plug body is positioned to be compressed against a seal positioned in the one or more additional bores, and wherein axial movement of the plug body in a direction toward an outlet of the one or more additional bores is restricted, at least in part, by the rings lock ring.

6. The fluid end of claim 1, wherein the one or more plug assemblies further comprising one or more retaining assemblies positioned to apply the axial force to the plug body to transition the plug body between a deactivated position and an activated position, and wherein the plug body has a seal positioned to be compressed against a wall of the one or more additional bores.

7. The fluid end of claim 6, further comprising a fluid end body comprising the first bore, wherein the lock ring further includes a lock ring body positioned to engage at least a portion of the fluid end body when the one or more plug assemblies is in the activated position, and wherein the seal comprises a piston seal.

8. The fluid end of claim 6, wherein at least a portion of the one or more retaining assemblies is coupled to a face of the lock ring, and wherein the one or more rings further comprises a retaining plate, wherein each of the one or more retaining assemblies comprises the retaining plate coupled to the face of the lock ring.

9. The fluid end of claim 8, wherein the retaining plate comprises one or more of a solid plate or a portion of a ring.

10. The fluid end of claim 1, further comprising a pressure chamber, wherein the one or more additional bores is positioned opposite of and aligned with the first bore, and wherein the first bore and the one or more additional bores are coupled via the pressure chamber.

11. The fluid end of claim 1, further comprising a pressure chamber, wherein the one or more additional bores is substantially perpendicular to the first bore, and wherein the first bore and the one or more additional bores are connected via the pressure chamber.

12. A plug assembly comprising:
  a plug body including a first tapered profile and a second tapered profile;
  a lock ring positioned circumferentially about the plug body and including a first lock ring tapered profile and a second lock ring tapered profile, at least a portion of the lock ring positioned to overlap the plug body in both a deactivated position and an activated position;
  a retaining plate arranged proximate the one lock ring; and
  a fastener coupled to the plug body, the plug body to transition between the deactivated position and the activated position responsive to an axial force when applied by the fastener to the plug body so as to drive the plug body toward the retaining plate and cause the first tapered profile of the plug body to engage the first lock ring tapered profile and the second tapered profile of the plug body to engage the second lock ring tapered profile.

13. The plug assembly of claim 12, wherein the plug body includes a seal groove, and wherein the plug assembly further comprises a seal arranged within the seal groove of the plug body.

14. The plug assembly of claim 13, wherein the plug body is configured such that the seal is positioned out of alignment with a bore wall of a bore in the deactivated position and in alignment with the bore wall of the bore in the activated position.

15. The plug assembly of claim 12, wherein the lock includes a plurality of segments and a lock ring arm, and wherein an arm outer diameter of the lock ring arm is greater than a retaining plate diameter of the retaining plate.

16. The plug assembly of claim 12, wherein the fastener comprises a first fastener, wherein the plug assembly further comprises a second fastener, wherein the first fastener including an elevator stud, and wherein the second fastener including a nut.

17. The plug assembly of claim 12, wherein the plug body includes a sealing surface positioned to engage a seal within a bore.

18. A method comprising:
  positioning a plug body, when in a deactivated position, within a bore, the plug body including a first tapered profile and a second tapered profile;
  applying an axial force to the plug body, the axial force being in a direction along an axis of the bore, thereby to move the plug body from the deactivated position to an activated position; and
  causing contact between the first tapered profile of the plug body and a first lock ring tapered profile of a lock ring positioned about the plug body and between the second tapered profile of the plug body and a second lock ring tapered profile of the lock ring.

19. The method of claim 18, wherein a seal associated with the plug body is aligned with the wall of the bore when the plug body is in the activated position.

20. The method of claim 18, wherein the axial force is caused, at least in part, by one or more of: (a) rotation of a fastener, or (b) fluid pressure.

* * * * *